(12) United States Patent
Katano et al.

(10) Patent No.: US 7,834,909 B2
(45) Date of Patent: Nov. 16, 2010

(54) IMAGE PROCESSING METHOD AND IMAGE PROCESSING APPARATUS

(75) Inventors: Yasuo Katano, Kawasaki (JP); Masakazu Fujiki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1233 days.

(21) Appl. No.: 11/416,579

(22) Filed: May 2, 2006

(65) Prior Publication Data
US 2006/0256036 A1    Nov. 16, 2006

(30) Foreign Application Priority Data
May 11, 2005    (JP)    ............... 2005-138455

(51) Int. Cl.
*H04N 5/228* (2006.01)
*G09G 5/00* (2006.01)
(52) U.S. Cl. .................. 348/208.99; 345/629; 345/632
(58) Field of Classification Search ...................... 345/7, 345/8, 9, 629, 632
See application file for complete search history.

(56) References Cited

U.S. PATENT DOCUMENTS

| 6,522,312 | B2 * | 2/2003 | Ohshima et al. | 345/8 |
| 6,972,734 | B1 * | 12/2005 | Ohshima et al. | 345/8 |
| 7,123,214 | B2 * | 10/2006 | Kuroki et al. | 345/8 |
| 7,365,706 | B2 * | 4/2008 | Shimoyama et al. | 345/8 |
| 2002/0060648 | A1 * | 5/2002 | Matsui et al. | 345/8 |
| 2004/0109009 | A1 * | 6/2004 | Yonezawa et al. | 345/632 |

FOREIGN PATENT DOCUMENTS

JP    2002-159019    5/2002

* cited by examiner

*Primary Examiner*—James M Hannett
(74) *Attorney, Agent, or Firm*—Cowan, Liebowitz & Latman, P.C.

(57) ABSTRACT

When a message indicating that a hand that wears a glove (21) is laid out in accordance with a hand-shaped virtual object is detected, the position and orientation relationship between a magnetic receiver (203) and the hand-shaped virtual object is calculated using the position and orientation relationship between the magnetic receiver (203) and a magnetic receiver (202) and that of the hand-shaped virtual object and the magnetic receiver (202).

5 Claims, 6 Drawing Sheets

IMAGE PROCESSING METHOD AND IMAGE PROCESSING APPARATUS

FIELD OF THE INVENTION

The present invention relates to an alignment technique between a physical space and virtual space.

BACKGROUND OF THE INVENTION

A mixed reality (MR) system provides, to the user, a combined image obtained by combining a physical space image and a virtual space image generated according to the viewpoint position, the line of sight direction, and the like of the user (see Japanese Patent Laid-Open No. 2002-159019). The MR system can present a virtual object to the observer as if it were existing on a physical space, and allows the observer to make an observation with a sense of actual dimensions and higher reality than a conventional virtual reality (VR) system.

On the other hand, as a conventional method of verifying the operability, maintainability, and assembling ability of objects designed by three-dimensional CAD in the design and manufacture fields, a method of manipulating a hand as a virtual object displayed on the virtual space using a hand as physical objects to allow the user to touch, manipulate, and verify, by his or her hand, a prototype object as if that object were existing there.

For this purpose, the position, orientation, and enlargement scale of the virtual object must be corrected to match the hand as the physical object.

However, in order to accurately calibrate the hand as the physical object and that as the virtual object in the above system, there are many correction parameters such as the overall size, the width and height of the palm, the lengths of fingers, and the like. Upon calibration of an object which has a complicated and flexible shape like the hand, deformations of the hand shape must be coped with. Normally, a method of correcting the enlargement scale by designating all feature points required to correct the enlargement magnification using a device such as a mouse, three-dimensional pointing device, or the like that can designate arbitrary points on the space is used. However, this method requires long calibration time, thus impairing the interfacing of the system.

When the above verification system is used by a plurality of operators, and when the operator changes, the hand as the physical object also changes. Therefore, calibration must be done frequently, thus bottlenecking easiness and speeding up of calibration.

When calibration must be frequently done for an object with a complicated and flexible shape like the hand as the physical object, a method of performing easy calibration between the physical object and virtual object at high speed is demanded.

SUMMARY OF THE INVENTION

The present invention has been made in consideration of the above problems, and has as its object to provide a technique that allows easy position and orientation alignment and size adjustment between a body part of the user, especially, a hand, and a virtual object that expresses the hand.

In order to achieve an object of the present invention, for example, an image processing method of the present invention comprises the following arrangement.

That is, an image processing method characterized by comprising:

a first acquisition step of acquiring a position and orientation of a first physical object;

a second acquisition step of acquiring a position and orientation of one point in a predetermined region on a surface of a second physical object;

a first layout step of laying out a virtual object that represents the first physical object in the predetermined region so as to have a predetermined position and orientation; and a calculation step of calculating, when a message indicating the first physical object is laid out so as to adjust the virtual object is detected a position and orientation relationship between the first physical object and the virtual object using a position and orientation relationship between the first physical object and the one point and a position and orientation relationship between the virtual object and the one point.

In order to achieve an object of the present invention, for example, an image processing method of the present invention comprises the following arrangement.

That is, an image processing method characterized by comprising:

a first acquisition step of acquiring a position and orientation of a first physical object;

a second acquisition step of acquiring a position and orientation of a viewpoint of a user;

a third acquisition step of acquiring a position and orientation of a predetermined region on a surface of a second physical object;

a display step of presenting an image obtained by compositing an image of the virtual object on the predetermined region based on the position and orientation acquired in the second acquisition step; and a calculation step of calculating, based on a signal indicating that the first physical object is adjusted to the image, a position and orientation relationship between the first physical object and the virtual object using a positional relationship between the position and orientation of the first physical object and the image of the virtual object and a positional relationship between the image of the virtual object and the position and orientation of the predetermined region.

In order to achieve an object of the present invention, for example, an image processing apparatus of the present invention comprises the following arrangement.

That is, an image processing apparatus characterized by comprising:

first acquisition unit adapted to acquire a position and orientation of a first physical object;

second acquisition unit adapted to acquire a position and orientation of one point in a predetermined region on a surface of a second physical object;

first layout unit adapted to laying out a virtual object that represents the first physical object in the predetermined region so as to have a predetermined position and orientation; and calculation unit adapted to, when a message indicating the first physical object is laid out so as to adjust the virtual object is detected, calculate a position and orientation relationship between the first physical object and the virtual object using a position and orientation relationship between the first physical object and the one point and a position and orientation relationship between the virtual object and the one point.

In order to achieve an object of the present invention, for example, an image processing apparatus of the present invention comprises the following arrangement.

That is, an image processing apparatus characterized by comprising:

first acquisition unit adapted to acquire a position and orientation of a first physical object;

second acquisition unit adapted to acquire a position and orientation of a viewpoint of a user;

third acquisition unit adapted to acquire a position and orientation of a predetermined region on a surface of a second physical object;

display means for presenting an image obtained by compositing an image of the virtual object on the predetermined region based on the position and orientation acquired by the second acquisition unit; and calculation unit adapted to calculate, based on a signal indicating that the first physical object is adjusted to the image, a position and orientation relationship between the first physical object and the virtual object using a positional relationship between the position and orientation of the first physical object and the image of the virtual object and a positional relationship between the image of the virtual object and the position and orientation of the predetermined region.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

In this embodiment, a hand is used as an example of a user's body part. Hence, a technique for performing position and orientation alignment and size adjustment between the user's hand and a virtual object that expresses a hand will be described hereinafter.

Figure 1:
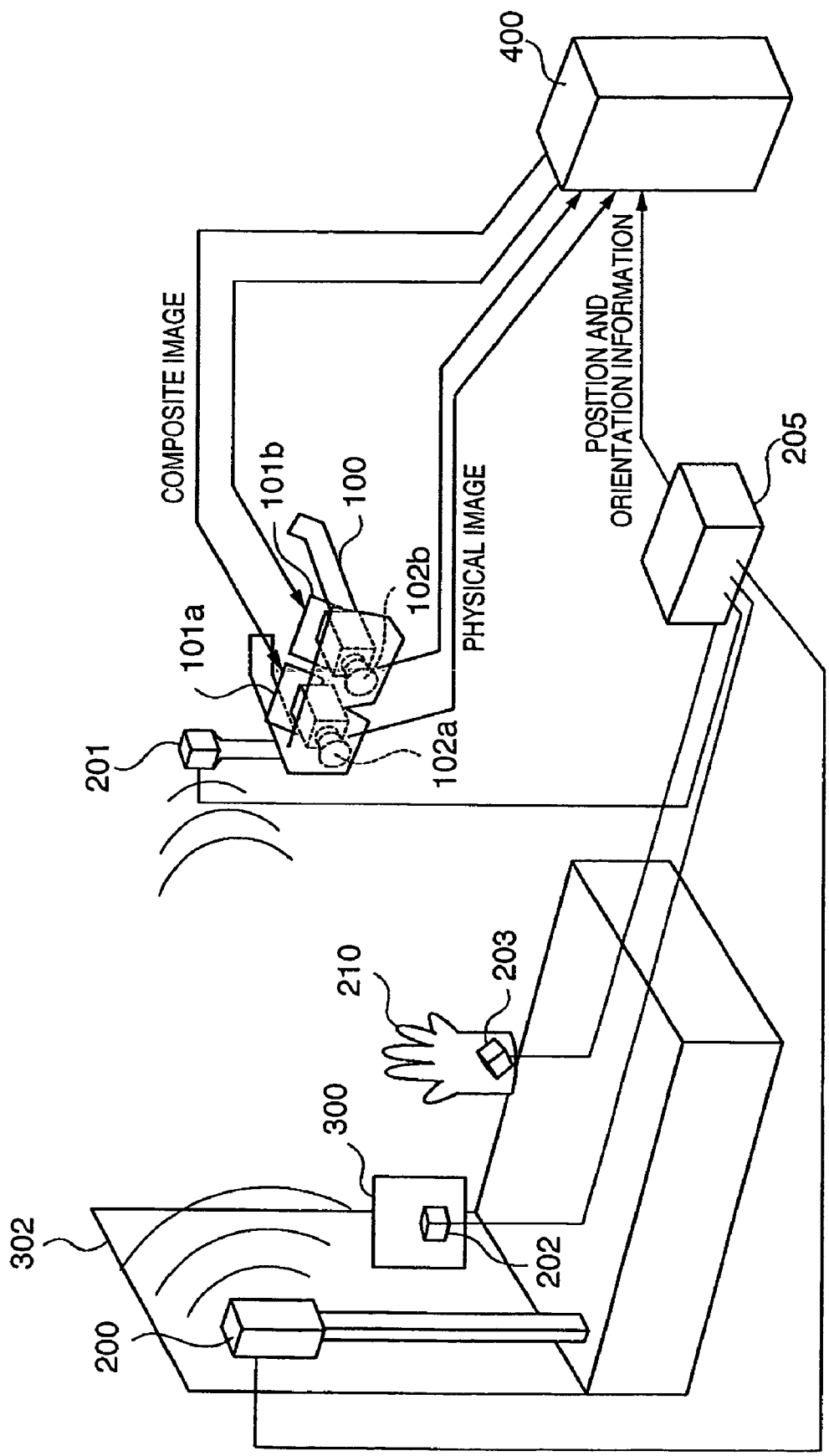
FIG. 1 is a block diagram showing the functional arrangement of a system according to an embodiment of the present invention, which provides a MR space obtained by superposing a virtual space onto a physical space to the observer.

FIG. 1 is a block diagram showing the functional arrangement of a system according to this embodiment, which provides an MR space obtained by superposing a virtual space onto a physical space to the observer.

Referring to FIG. 1, reference numeral 200 denotes a transmitter which generates a magnetic field. Reference numeral 100 denotes a head-mounted display device (to be abbreviated as an HMD hereinafter), which is mounted on the head of the observer to present images on the MR space formed by combining the physical space and virtual space to positions before eyes. The HMD 100 comprises cameras 102a and 102b, display devices 101a and 101b, and a magnetic receiver 201.

The cameras 102a and 102b respectively capture moving images of the physical space viewed from the right and left eyes of the observer who wears the HMD 100 on the head. The captured frame images are output to a computer 400. In the following description, the cameras 102a and 102b will also be referred to as a "viewpoint" in some cases.

The display devices 101a and 101b are mounted on the HMD 100 to be located in front of the right and left eyes when the observer wears the HMD 100 on the head, and display images based on image signals output from the computer 400. Therefore, the images generated by the computer 400 are provided to the positions in front of the right and left images of the observer.

The magnetic receiver 201 detects a change in magnetic field generated by the transmitter 200, and outputs the detection result signal to a position and orientation measuring device 205. The detection result signal indicates a change in magnetic field which is detected in correspondence with the position and orientation of the magnetic receiver 201 on a coordinate system (to be referred to as a sensor coordinate system hereinafter) which has the position of the transmitter 200 as an origin, and three axes perpendicular to each other at the position of this origin as x-, y-, and z-axes.

Reference numeral 210 denotes a glove worn by the observer on the hand. The glove 210 comprises a magnetic receiver 203. The magnetic receiver 203 outputs a signal indicating a change in magnetic field detected according to the position and orientation of itself on the sensor coordinate system (in other words, a signal indicating the position and orientation of the magnetic receiver 203 itself on the sensor coordinate system) to the position and orientation measuring device 205 as in the magnetic receiver 201. Therefore, the position and orientation measuring device 205 can calculate the position and orientation of the magnetic receiver 203 on the sensor coordinate system, and outputs data indicating the calculated position and orientation to the computer 400. Note that the glove 210 is not indispensable as long as the position and orientation of the observer's hand can be measured. For example, the magnetic receiver 203 may be directly attached to the hand.

Reference numeral 300 denotes a tray on which the observer's hand is placed, and which is laid out on a horizontal plane such as a desk and the like. The tray 300 comprises a magnetic receiver 202. The magnetic receiver 202 outputs a signal indicating a change in magnetic field detected according to the position and orientation of itself on the sensor coordinate system (in other words, a signal indicating the position and orientation of the magnetic receiver 202 itself on the sensor coordinate system) to the position and orientation measuring device 205 as in the magnetic receiver 201. Therefore, the position and orientation measuring device 205 can calculate the position and orientation of the magnetic receiver 202 on the sensor coordinate system, and outputs data indicating the calculated position and orientation to the computer 400.

Reference numeral 400 denotes a computer which generates image signals to be output to the display devices 101a and 101b of the HMD 100, receives data from the position and orientation measuring device 205, and executes processing such as management of received data and the like.

Figure 2:
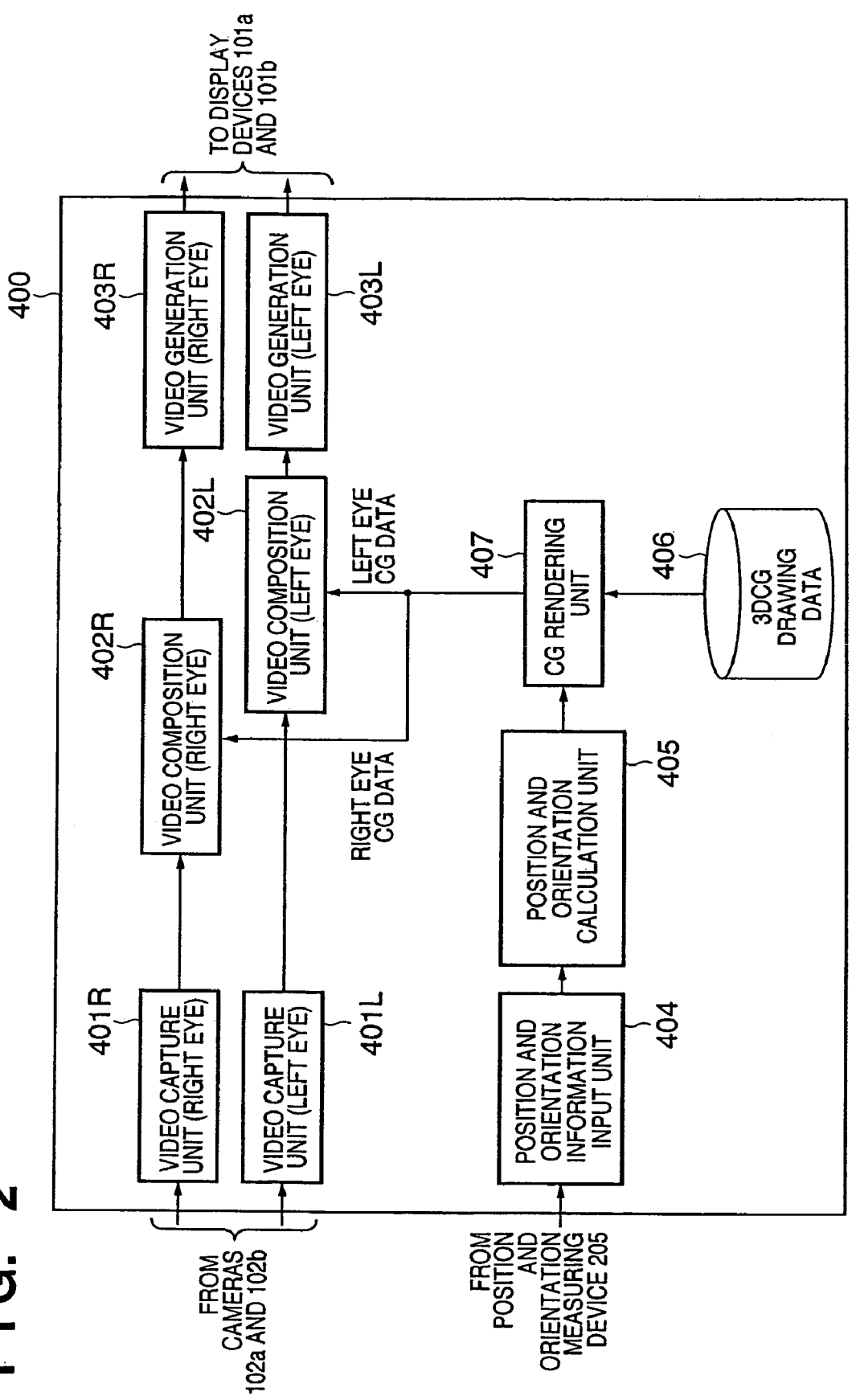
FIG. 2 is a block diagram showing the functional arrangement of a computer 400.

FIG. 2 is a block diagram showing the functional arrangement of this computer 400.

Reference numerals 401R and 401L denote video capture units, which respectively-capture images input from the cameras 102a and 102b as digital signals.

Reference numeral 404 denotes a position and orientation information input unit, which fetches data output from the position and orientation measuring device 205. This data includes data indicating the positions and orientations of the magnetic receivers 201, 202, and 203 on the sensor coordinate system.

Reference numeral 405 denotes a position and orientation calculation unit, which calculates the position and orientation relationships among the cameras 102a and 102b and the tray 300 (magnetic receiver 202). Assume that the position and orientation relationships (biases) among the magnetic receiver 201 and the cameras 102a and 102b are calculated in advance. Therefore, when data indicating the position and orientation of the magnetic receiver 201 on the sensor coordinate system is input from the position and orientation information input unit 404, the positions and orientations of the cameras 102a and 102b on the sensor coordinate system can be calculated by adding the biases to this data. Using the positions and orientations of the cameras 102a and 102b on the sensor coordinate system and those of the magnetic receiver 202 on the sensor coordinate system, which are input from the position and orientation information input unit 404, their position and orientation relationships are calculated.

Reference numeral 406 denotes a 3DCG drawing data DB which is a DB for data (3DCG drawing data) required to generate an image of a virtual object that forms the virtual space. The 3DCG drawing data includes data indicating the geometrical shape and color, texture data, data indicating the position and orientation, and the like of the virtual object. In this embodiment, assume that the 3DCG data includes data required to generate an image of a virtual object of a hand having a general size and shape (to be referred to as a hand-shaped virtual object).

Reference numeral 407 denotes a CO rendering unit which generates an image on the virtual space-that is seen according to the positions and orientations of the cameras 102a and.102b, calculated by the position and orientation calculation unit 405.

Reference numerals 402R and 402L denote video composition units, which superimpose the images of the virtual object, which are generated by the CG rendering unit 407 and are to be seen according to the positions and orientations of the cameras 102a and 102b, onto the images of the physical spaces input from the video capture units 401R and 401L. In this case, these video composition units 402R and 402L do not superpose the images of the virtual objects in a region where the observer's hand (in this case, the hand that wears the glove 210) appear in the image of physical space. That is, when the observer's hand appears in the images of the MR space generated by the video composition units 402R and 402L, this hand is always displayed on the front side. Since such technique is known to those who are skilled in the art, a description thereof will be omitted.

The video composition units 402R and 402L output the generated images to video generation units 403R and 403L, respectively. In this way, the image on the MR space, which is to be seen according to the position and orientation of the camera 102a, and that on the MR space, which is to be seen according to the position and orientation of the camera 102b, can be generated.

Reference numerals 403R and 403L denote video generation units, which respectively convert the images on the MR space, that are output from the video composition units 402R and 402L into analog signals, and output the converted analog signals to the display devices 101a and 101b as video signals. In this way, the images on the MR space which correspond to the two eyes are displayed before the right and left eyes of the observer who wears the HMD 100 on the head.

Figure 4:
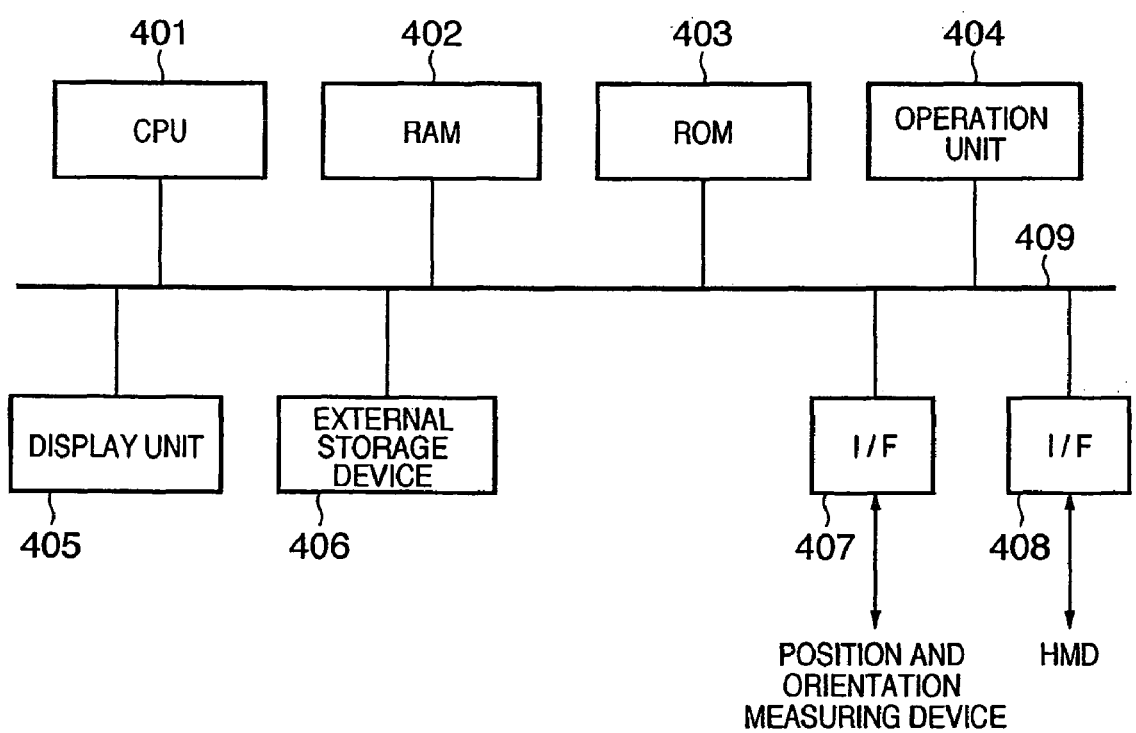
FIG. 4 is a block diagram showing the hardware arrangement of the computer 400.

FIG. 4 is a block diagram showing-the hardware arrangement of the computer 400 having the above functional arrangement.

Reference numeral 401 denotes a CPU which controls the overall computer 400 using programs and data stored in a RAM 402 and ROM 403, and executes processes to be described later as those to be executed by the computer 400.

Reference numeral 402 denotes a RAM which can provide various areas such as an area for temporarily storing programs and data loaded from an external storage device 406, an area for temporarily storing data received via I/Fs 407 and 408, a work area required when the CPU 401 executes various kinds of processing, and the like, as needed.

Reference numeral 403 denotes a ROM which stores setting data, a boot program, and the like of the computer 400.

Reference numeral 404 denotes an operation unit which comprises a keyboard, mouse, and the like, and can input various instructions to the CPU 401 when it is operated by the operator of this computer 400.

Reference numeral 405 denotes a display unit which comprises a CRT, liquid crystal display, or the like, and can display the processing results of the CPU 401 by means of images, characters, and the like.

Reference numeral 406 denotes an external storage device which serves as a large-capacity information storage device represented by a hard disk drive device. The external storage device 406 saves an OS (operating system), programs that make the CPU 401 execute the processes to be described later as those to be executed by the computer 400, data, and the like. These programs and data are loaded onto the RAM 402 under the control of the CPU 401, and are to be processed by the CPU 401.

Reference numeral 407 denotes an I/F, which serves as an interface required to connect the position and orientation measuring device 205. Data output from the position and orientation measuring device 205 is input to the RAM 402 or the external storage device 406 via this I/F 407.

Reference numeral 408 denotes an I/F, which serves as an interface required to connect the cameras 102a and 102b and display devices 101a and 101b of the HMD 100. Image signals output from the cameras 102a and 102b are input to the RAM 402 or the external storage device 406 via this I/F 408. The images of the MR space generated by this computer 400 are output to the display devices 101a and 101b via this I/F 408.

Reference numeral 409 denotes a bus which interconnects the aforementioned units.

Figure 5:
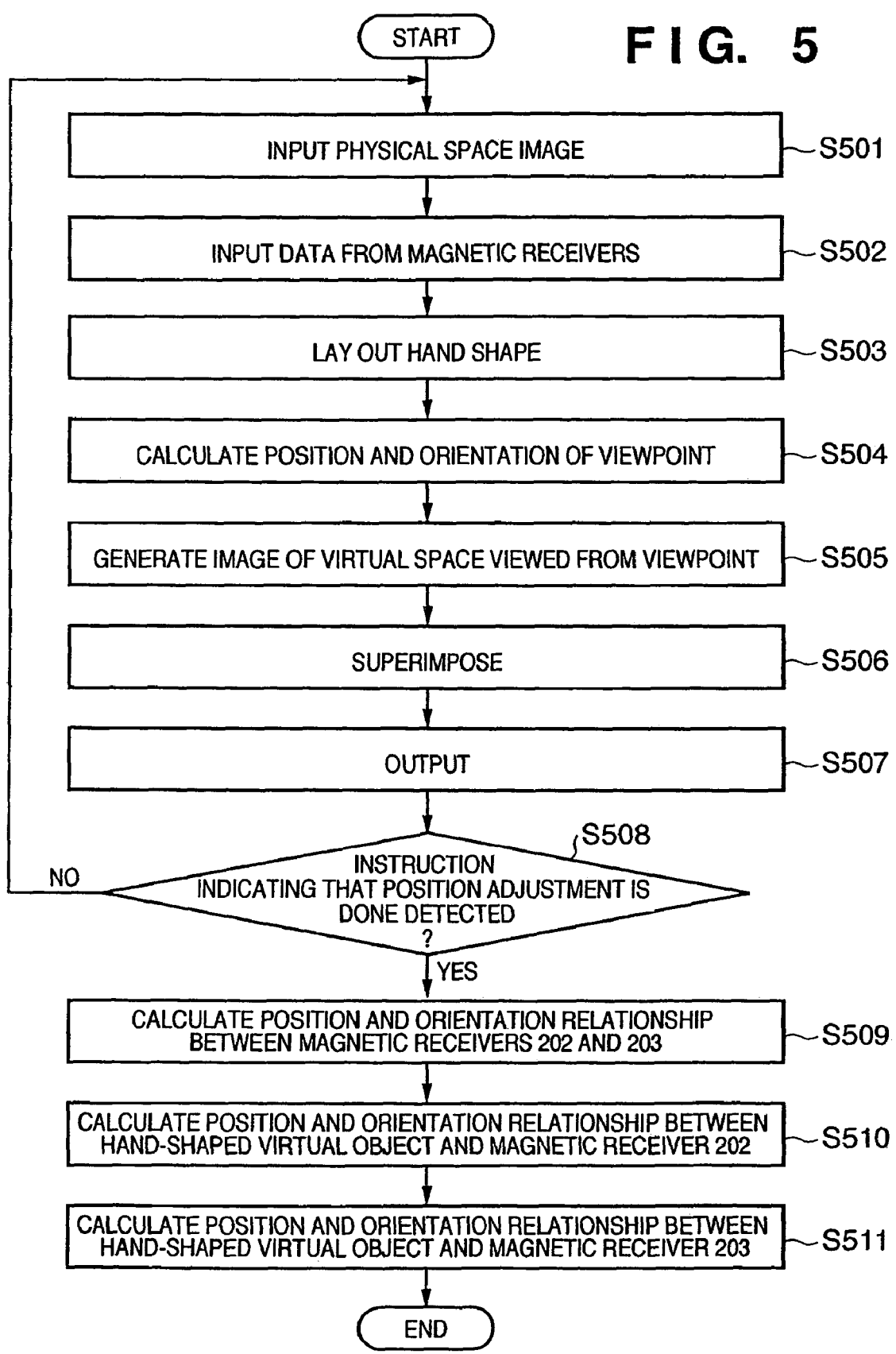
FIG. 5 is a flowchart of processing for aligning the position and orientation of a hand that wears a glove 210 and the hand-shaped virtual object.

The processing to be executed by the computer 400 with the above arrangement will be described below using FIG. 5 showing the flowchart of this processing. FIG. 5 is a flowchart of the processing for aligning the positions and orientations of the hand that wears the glove 210 and the hand-shaped virtual object. Note that the program and data for making the CPU 401 execute the processing according to the flowchart in FIG. 5 are saved in the external storage device 406, and are loaded onto the RAM 402 as needed when the CPU 401 executes processing using the loaded program and data, the computer 400 executes processes to be described below.

Since physical space images for the right and left eyes captured by the cameras 102a and 102b are input to the RAM 402 or the external storage device 406 via the I/F 408, the CPU 401 stores them in the RAM 402 (step S501).

Since data (those which indicate the positions and orientations of the magnetic receivers 201, 202, and 203 on the sensor coordinate system) output from the position and orientation measuring device 205 are input to the RAM 402, the CPU 401 stores them in the RAM 402 (step S502).

The CPU 401 then lays out the contour (hand shape) of the hand-shaped virtual object on the tray 300 (step S503). The processing in step S503 will be described in detail below.

Figure 3A:
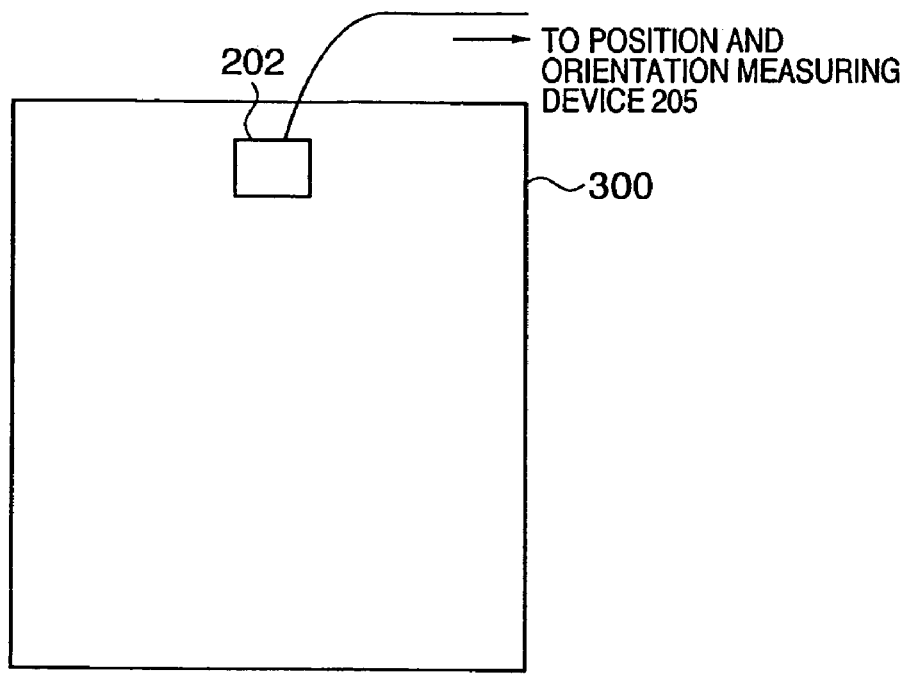
FIG. 3A shows an example as to how a hand is placed on a tray 300.

The tray 300 is placed on the horizontal plane such as a desk or the like, as shown in FIG. 3A. FIG. 3A shows an example indicating how a hand is placed on the tray 300. As shown in FIG. 3A, the magnetic receiver 202 is attached to an arbitrary position on the tray 300.

The CPU 401 generates the hand-shaped virtual object by loading its drawing data from the external storage device 406 onto the RAM 402, and lays it out on the tray 300. Since data (to be referred to as tray plane definition data hereinafter) required to define the plane of the tray 300 (to be referred to as a tray plane hereinafter) on the sensor coordinate system is saved in advance in the external storage device 406, the CPU 401 reads it out, and lays out the hand-shaped virtual object at a predetermined position on this plane. Note that the hand-shaped virtual object is virtually laid out to attain the following processing but it is not laid out for display purposes.

Next, the CPU 401 obtains a region of the hand-shaped virtual object on the tray plane by orthogonally projecting it onto the tray plane. Then, the CPU 401 obtains the contour of this region, i.e., a hand shape, and lays it out on the tray 300.

Figure 3B:
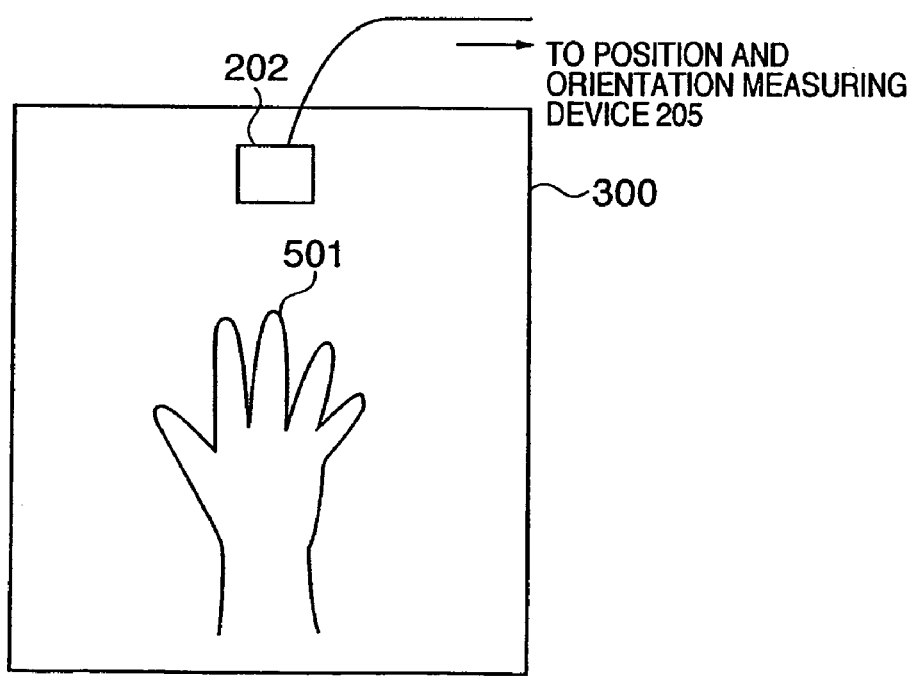
FIG. 3B shows an example of the contour of a hand-shaped virtual object placed on the tray 300.

FIG. 3B shows an example of the contour of the hand-shaped virtual object laid out on the tray 300. Reference numeral 501 denotes this contour. In the following processing, the observer places the hand that wears the glove 210 to fit in the hand shape indicated by this contour.

Note that the contour of the hand-shaped virtual object is laid out on the tray 300 in step S503. However, the present invention is not limited to this. For example, any other patterns may be laid out on the tray 300 as long as the observer can recognize the position and orientation at which the hand that wears the glove 210 is to be placed. For example, a region itself obtained by orthogonally projecting the hand-shaped virtual object onto the tray plane may be laid out.

The contour of the hand-shaped virtual object or the region itself obtained by orthogonally projecting the hand-shaped virtual object onto the tray plane may be generated in advance, and the contour or region generated in advance may be laid out on the tray plane in step S503.

Referring back to FIG. 5, bias data indicating the position and orientation relationship between the magnetic receiver 201 and camera 102a is read out from the external storage device 406 and is added to the data indicating the position and orientation of the magnetic receiver 201 on the sensor coordinate system, which is acquired in step S502, to obtain the position and orientation of the camera 102a on the sensor coordinate system. Also, bias data indicating the position and orientation relationship between the magnetic receiver 201 and camera 102b is read out from the external storage device 406 and is added to the data indicating the position and orientation of the magnetic receiver 201 on the sensor coordinate system, which is acquired in step S502, to obtain the position and orientation of the camera 102b on the sensor coordinate system (step S504). In this way, the position and orientation of the viewpoint on the sensor coordinate system are obtained.

Images obtained when the virtual space on which the contour is laid out is to be seen from the cameras 102a and 102b are generated (step S505), and are respectively superimposed on the physical space images for the right and left eyes, which are stored in the RAM 402 in step S501, thus generating MR space images for the right and left eyes on the RAM 402 (step S506). Upon executing this superimposing processing, as described above, nothing is superimposed on the region of the hand in each physical space image.

The MR space images for the right and left eyes are respectively output to the display devices 101a and 101b via the I/F 408 (step S507). In this way, since the MR space images for the right and left eyes are respectively displayed on the display screens of the display devices 101a and 101b, the MR space images according to the positions and orientations of the eyes are presented to positions in front of the right and left eyes of the observer.

The observer then places the hand that wears the glove 210 on the tray 300 to fit in the hand shape. When the observer determines that the hand that wears the glove 210 matches the hand shape (when he or she determines that the hand that wears the glove 210 matches the hand-shaped virtual object in fact), he or she inputs an instruction that advices accordingly to the computer 400. The input form is not particularly limited, and the operator may input that instruction by means of the keyboard or mouse, or by speech.

When the CPU 401 detects this instruction input, the flow advances to step S509 via step S508, and the CPU 401 calculates the position and orientation relationship between the magnetic receivers 202 and 203 using "data indicating the position and orientation of the magnetic receiver 202 on the sensor coordinate system" and "data indicating-the position and orientation of the magnetic receiver 203 on the sensor coordinate system", which are received from the position and orientation measuring device 205 at the time of detection of the instruction (step S509).

Next, using the "data indicating the position and orientation of the magnetic receiver 202 on the sensor coordinate system" which is received from the position and orientation measuring device 205 at the time of detection of the instruction, and the layout position and orientation of the hand-shaped virtual object, the position and orientation relationship between the magnetic receiver 202 and hand-shaped-virtual object is calculated (step S510).

Using the position and orientation relationship calculated in step S509 and that calculated in step S510, the position and orientation relationship between the magnetic receiver 203 and hand-shaped virtual object is calculated (step S511).

Figure 6:
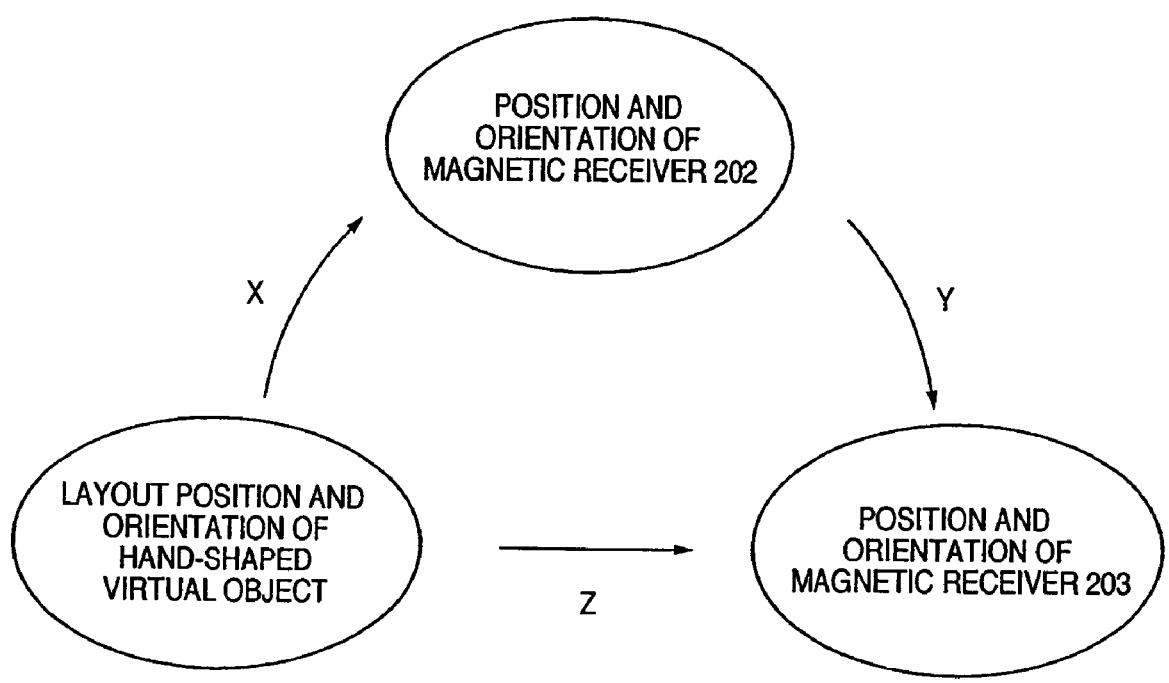
FIG. 6 is a view showing the position and orientation relationships among magnetic receivers 202 and 203, and the hand-shaped virtual object.

The processing in steps S509 to S511 will be described below using FIG. 6. FIG. 6 shows the position and orientation relationship among the magnetic receivers 202 and 203 and the hand-shaped virtual object. When the position and orientation relationship between the magnetic receivers 202 and 203, in other words; a matrix Y required to convert the position and orientation of the magnetic receiver 202 to those of the magnetic receiver 203 is obtained in step S509, and when the position and orientation relationship between the magnetic receiver 202 and hand-shaped virtual object, in other words, a matrix X required to convert the layout position and orientation of the hand-shaped virtual object into the position and orientation of the magnetic receiver 202 is obtained in step S510, the product of the matrices X and Y is calculated in step S511 to calculate a matrix Z required to convert the layout position and orientation of the hand-shaped virtual object into the position and orientation of the magnetic receiver 203.

This matrix Z indicates errors of the positions and orientations between the hand-shaped virtual object and magnetic receiver 203 when the hand that wears the glove 210 matches the hand shape viewed from the eyes of the observer himself or herself. Therefore, when this error data is saved in the external storage device 406, the hand-shaped virtual object can be laid out to substantially match the position and orientation of the hand that wears the glove 210 if the hand-shaped virtual object is laid out at the position and orientation obtained by converting those of the magnetic receiver 203 using the matrix Z.

In this embodiment, a video see-through type HMD is used. Alternatively, an optical see-through type HMD may be used.

In the aforementioned processing, since the hand that wears the glove 210 is placed on the tray 300, i.e., the horizontal plane, a change in position has three degrees of freedom, i.e., two components in the plane, and a rotation component (yaw angle) in the plane. In this way, although the "position and orientation" originally include a total of six components, i.e., three components for the position and three components for the orientation, the above processing performs calibration for fewer components, and the calibration processing can be made at higher speed than in the conventional system.

However, with the above processing alone, the size of the hand that wears the glove 210 and that of the hand-shaped virtual object do not match. This is because the hand-shaped virtual object is generated to have a general size. This size does not always match a specific observer. Hence, after the above processing, the ratio between the sizes of the hand-shaped virtual object and the hand that wears the glove 210 is calculated. By changing the size of the hand-shaped virtual object by the calculated ratio, the size of the hand-shaped virtual object is substantially matched with that of the hand that wears the glove 210.

Various kinds of processing for calculating such ratio may be used. For example, the following processing may be used. A minimum box (first box) which includes a region of the hand that wears the glove 210 is defined in the physical space image. Next, a minimum box (second box) that includes a region occupied by the hand-shaped virtual object is defined in the virtual space image. Then, the ratio of the vertical (horizontal) size of the first box to the vertical (horizontal) size of the second box (the vertical (horizontal) size of the first box/the vertical (horizontal) size of the second box) is calculated.

The hand-shaped virtual object is scaled by the ratio calculated in this manner (the hand-shaped virtual object is enlarged to have an origin on a local coordinate system of the hand-shaped virtual object as the center). Note that such size adjustment processing is not indispensable, and it may be done if the actual hand and virtual hand have a considerable size difference when the observer observes the MR space image after the position and orientation alignment.

As described above, according to this embodiment, the actual hand and virtual hand can be easily calibrated at high speed originally, such system is an intuitive one which can be used by a plurality of users or a person when they feel necessity. Even in a scene in which the system is alternatively used by a plurality of operators, the hand calibration upon change can be done at high speed. Therefore, a system with high usability can be provided.

Conventionally, many correction elements are required in calibration between a physical object and virtual object. By interposing a physical object whose positional relationship on the virtual space is known, the degrees of freedom are reduced; and it can be limited to set the hand shape to be equal to the virtual hand when the operator places the hand on the physical object, thus allowing quick and easy calibration.

Second Embodiment

In the first embodiment, the hand is placed on the horizontal plane to reduce the number of correction elements required upon calibration. However, the aforementioned processing can be generally applied when the hand is placed on a physical object of an arbitrary shape, and the body part of a person to be placed may be a foot in place of the hand. Also, an appropriate physical object may be placed in place of the body part.

In the first embodiment, the hand is placed on the tray 300. However, the present invention is not limited to use of the tray 300. For example, a region on which the hand is to be placed may be assured on the horizontal plane such as a desk or the like. In this case, data that defines this region on the sensor coordinate system must be saved in the external storage device 406 in place of the tray plane definition data.

In the first embodiment, the magnetic sensors are used as the sensors. Other sensors such as optical sensors, ultrasonic wave sensors, and the like may be used.

Other Embodiments

The objects of the present invention are also achieved by supplying a recording medium (or storage medium), which records a program code of a software program that can implement the functions of the above-mentioned embodiments to the system or apparatus, and reading out and executing the program code stored in the recording medium by a computer (or a CPU or MPU) of the system or apparatus. In this case, the program code itself read out from the recording medium implements the functions of the above-mentioned embodiments, and the recording medium which stores the program code constitutes the present invention.

The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the recording medium is written in a memory of the extension card or unit.

When the present invention is applied to the recording medium, that recording medium stores a program code corresponding to the aforementioned flowchart.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-138455, filed May 11, 2005, which is hereby incorporated by reference herein in its entirety.

What is claimed is:

1. An image processing method characterized by comprising:
- a first acquisition step of acquiring a position and orientation of a first physical object;
- a second acquisition step of acquiring a position and orientation of one point in a predetermined region on a surface of a second physical object;
- a first layout step of laying out a virtual object that represents the first physical object in the predetermined region so as to have a predetermined position and orientation; and
- a calculation step of calculating, when a message indicating the first physical object is laid out so as to adjust a region obtained by orthogonally projecting the virtual object onto the surface is detected, a position and orientation relationship between the first physical object and the virtual object using a position and orientation relationship between the first physical object and the one point and a position and orientation relationship between the virtual object and the one point.

2. The method according to claim 1, characterized by further comprising:
- a third acquisition step of acquiring an image of a physical space which is seen from a viewpoint of a user;
- a ratio calculation step of calculating a ratio of a size of the first physical object to a size of the visual object based on an image region of the image in which the first physical object appears, and an image of the virtual object which is seen from the viewpoint; and
- a change step of changing the size of the virtual object to fit the size of the first physical object using the ratio.

3. A program characterized by making a computer execute an image processing method of claim 1.

4. A computer readable storage medium characterized by storing a program of claim 3.

5. An image processing apparatus characterized by comprising:
- a first acquisition unit adapted to acquire a position and orientation of a first physical object;
- a second acquisition unit adapted to acquire a position and orientation of one point in a predetermined region on a surface of a second physical object;
- a first layout unit adapted to laying out a virtual object that represents the first physical object in the predetermined region so as to have a predetermined position and orientation; and
- a calculation unit adapted to, when a message indicating the first physical object is laid out so as to adjust a region obtained by orthogonally projecting the virtual object onto the surface is detected, calculate a position and orientation relationship between the first physical object and the virtual object using a position and orientation relationship between the first physical object and the one point and a position and orientation relationship between the virtual object and the one point.

* * * * *